United States Patent
Kim et al.

(10) Patent No.: US 12,219,438 B2
(45) Date of Patent: Feb. 4, 2025

(54) COMMUNICATION METHOD AND DEVICE IN WIRELESS COMMUNICATION SYSTEM SUPPORTING EDGE COMPUTING

(71) Applicant: Samsung Electronics Co., Ltd., Suwon-si (KR)

(72) Inventors: Hyesung Kim, Suwon-si (KR); Jicheol Lee, Suwon-si (KR); Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 17/572,400

(22) Filed: Jan. 10, 2022

(65) Prior Publication Data

US 2022/0225061 A1     Jul. 14, 2022

(30) Foreign Application Priority Data

Jan. 12, 2021   (KR) .......................... 10-2021-0004288

(51) Int. Cl.
*H04W 4/14*     (2009.01)
*H04W 4/50*     (2018.01)

(52) U.S. Cl.
CPC .............. *H04W 4/14* (2013.01); *H04W 4/50* (2018.02)

(58) Field of Classification Search
CPC ..................................................... H04W 4/14
See application file for complete search history.

(56) References Cited

U.S. PATENT DOCUMENTS

2011/0250909 A1    10/2011  Mathias et al.
2013/0268604 A1*   10/2013  Gupta ................. H04N 21/643
                                              709/206

(Continued)

FOREIGN PATENT DOCUMENTS

EP          3179686 B1      2/2020
EP          3930258 A1     12/2021
KR    10-2020-0115333 A    10/2020

OTHER PUBLICATIONS

Supplementary European Search Report dated Feb. 14, 2024, in connection with European Patent Application No. 22739570.4, 11 pages.

(Continued)

*Primary Examiner* — Charles N Appiah
*Assistant Examiner* — Frank E Donado

(57) ABSTRACT

A communication method and device in a wireless communication system supporting edge computing is provided. A method of a UE including an EEC in a communication system supporting an edge computing service using an EDN exchanging application data traffic with the UE is provided, the method comprises identifying whether the UE supports a SMS over NAS, transmitting, to an ECS managing configuration information of the EDN, a first service provisioning request message including an indication of the SMS over the NAS supported in case that the UE supports the SMS over the NAS, and in case that the UE receives, through a network from the ECS, an SMS message including triggering information related to an update of the configuration information, transmitting, to the ECS, a second service provisioning request message based on the triggering information.

16 Claims, 11 Drawing Sheets

(56) References Cited

U.S. PATENT DOCUMENTS

2016/0227468 A1 8/2016 Kim et al.
2021/0368339 A1* 11/2021 Watfa .................... H04W 12/08

OTHER PUBLICATIONS

International Search Report and Written Opinion of the International Searching Authority in connection with International Application No. PCT/KR2022/000242 issued Apr. 13, 2022, 11 pages.
Vivo, "Provisioning of a CAG information list in de-registration procedure," C1-205848, 3GPP TSG-CT WG1 Meeting #126-e, Electronic meeting, Oct. 15-23, 2020, 2 pages.
Supplementary European Search Report dated Nov. 24, 2023, in connection with European Patent Application No. 22739570.4, 12 pages.

* cited by examiner

COMMUNICATION METHOD AND DEVICE IN WIRELESS COMMUNICATION SYSTEM SUPPORTING EDGE COMPUTING

CROSS-REFERENCE TO RELATED APPLICATION

This application is based on and claims priority under 35 U.S.C. § 119 to Korean Patent Application No. 10-2021-0004288, filed on Jan. 12, 2021, in the Korean Intellectual Property Office, the disclosure of which is herein incorporated by reference in its entirety.

BACKGROUND

1. Field

The disclosure relates to edge computing technology and, more specifically, to a communication method and device in a wireless communication system supporting edge computing.

2. Description of Related Art

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

SUMMARY

The disclosure provides an efficient communication method and device in a wireless communication system supporting edge computing.

In accordance with an aspect of the disclosure, a method of a user equipment (UE) including an edge enabler client (EEC) in a communication system supporting an edge computing service using an edge data network (EDN) exchanging application data traffic with the UE is provided, the method comprises identifying whether the UE supports a short message service (SMS) over non-access-stratum (NAS), transmitting, to an edge configuration server (ECS) managing configuration information of the EDN, a first service provisioning request message including an indication of the SMS over the NAS supported in case that the UE supports the SMS over the NAS, and in case that the UE receives, through a network from the ECS, an SMS message including triggering information related to an update of the configuration information, transmitting, to the ECS, a second service provisioning request message based on the triggering information.

In accordance with another aspect of the disclosure, a UE in a communication system supporting an edge computing service using an EDN exchanging application data traffic with the UE is provided, the UE comprises a transceiver, and a processor configured to identify whether the UE supports a SMS over NAS, transmit, to an ECS managing configuration information of the EDN via the transceiver, a first service provisioning request message including an indication of the SMS over the NAS supported in case that the UE supports the SMS over the NAS, and in case that the UE receives, through a network from the ECS, an SMS message including triggering information related to an update of the configuration information, transmit, to the ECS via the transceiver, a second service provisioning request message based on the triggering information.

In accordance with another aspect of the disclosure, a method of an ECS managing configuration information of an EDN in a communication system supporting an edge computing service using the EDN exchanging application data traffic with the UE is provided, the method comprises receiving, from the UE, a first service provisioning request message including an indication of SMS over NAS supported, identifying whether the configuration information of the EDN is updated, transmitting, to the UE through a network, triggering information related to an update of the configuration information in case that the configuration information of the EDN is updated, and receiving, from the UE receiving an SMS message including the triggering information, a second service provisioning request message based on the triggering information.

In accordance with another aspect of the disclosure, an ECS managing configuration information of an EDN in a communication system supporting an edge computing service using the EDN exchanging application data traffic with the UE, the ECS comprises a communication interface, and a processor configured to receive, via the communication interface from the UE, a first service provisioning request message including an indication of SMS over NAS supported, identify whether the configuration information of the EDN is updated, transmit, to the UE through a network, triggering information related to an update of the configuration information in case that the configuration information of the EDN is updated, and receive, from the UE receiving an SMS message including the triggering information, a second service provisioning request message based on the triggering information.

In accordance with another aspect of the disclosure, a method of a UE including an EEC in a communication system supporting an edge computing service using an EDN exchanging application data traffic with the UE is provided, the UE comprises obtaining a push token from a push server for performing a push notification, transmitting, to an ECS managing configuration information of the EDN, a subscribe request message including the push token and information on the push server, and receiving, via the push sever from the ECS, the push notification including triggering information related to an update of the configuration information based on the subscribe request message.

In accordance with another aspect of the disclosure, a UE including an EEC in a communication system supporting an edge computing service using an EDN exchanging application data traffic with the UE is provided, the UE comprises a transceiver, and a processor coupled with the transceiver and configured to obtain a push token from a push server for performing a push notification, transmit, to an ECS managing configuration information of the EDN, a subscribe request message including the push token and information on the push server, and receive, via the push sever from the ECS, the push notification including triggering information related to an update of the configuration information based on the subscribe request message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
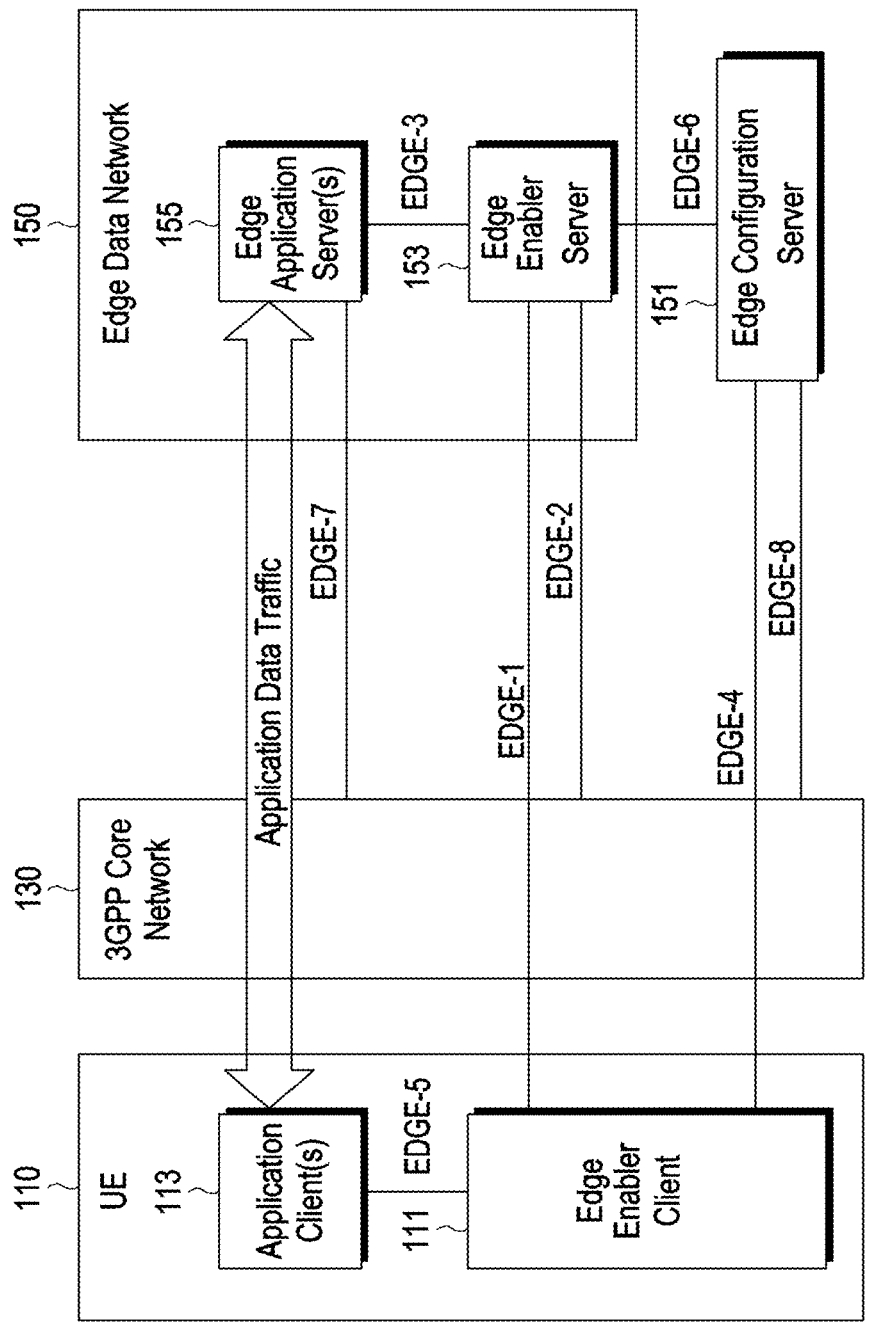
FIG. 1 is a view illustrating an example configuration of an edge computing system according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms referring to network entities and objects of an edge computing system as used herein, the terms referring to messages, and the term referring to identification information are provided as an example for ease of description. Thus, the disclosure is not limited by the terms, and such terms may be replaced with other terms denoting objects with equivalent technical concept.

Although terms and names as defined in the 5G system standard are used herein for ease of description, embodiments of the disclosure are not limited thereto or thereby, and the same may apply likewise to systems conforming to other standards.

Hereinafter, embodiments of the disclosure are described in detail with reference to the accompanying drawings. When making the gist of the disclosure unnecessarily unclear, the detailed description of known functions or configurations is skipped.

The electronic device according to various embodiments may be one of various types of electronic devices. The electronic devices may include, for example, a portable communication device (e.g., a smart phone), a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. According to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by the electronic device. For example, a processor of the electronic device may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the electronic device may be provided in the form of a non transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM) or digital video disc (DVD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The 5G network technology and edge computing technology shown in the drawings and described in the description of the disclosure refers to the standards (e.g., TS 23.558) defined by the international telecommunication union (ITU) or 3GPP, and each of the components included in the network environment of FIG. 1 to be described below may mean a physical entity unit or a software or module unit capable of performing an individual function.

According to an embodiment of the disclosure, electronic device may refer to various devices used by the user. For example, electronic device may mean a terminal, user equipment (UE), mobile station, subscriber station, remote terminal, wireless terminal, or user device. In the embodiments described below, user equipment (UE) is used as an example of the electronic device for convenience purposes.

According to an embodiment of the disclosure, an access network (AN) may provide a channel for wireless communication with the electronic device. An AN may mean a radio access network (RAN), a base station, an eNB, an eNodeB, a 5G node, a transmission/reception point (TRP), or a 5th generation NodeB (SGNB). According to an embodiment of the disclosure, a core network (CN) may manage at least one of subscriber information, mobility, access authorization, data packet traffic, or billing policy for the UE. The core network CN may include at least one of a user plane function (UPF) node, an access & mobility management function (AMF) node, a session management function (SMF) node, a unified data management (UDM) node, or a policy control function (PCF) node. For the functions and operations of the nodes (or entities) included in the core network CN, the standards (e.g., TS 23.501) defined by the 3GPP may be referred to.

Edge computing is technology that has been proposed to be able to host the service of the operator and/or a third party close to an access point, such as a base station, and reduce the end-to-end latency and load of the network to provide an efficient service. Such edge computing technology may shorten the data processing time by processing data in real time in a short distance from the site where the data is generated without transmitting the data generated from UEs to a central cloud network (hereinafter referred to as a "central cloud"). For example, edge computing technology may be applied to technical fields, e.g., autonomous vehicles, that require rapid processing in various situations that may occur while driving. Edge computing is a concept of a network architecture that enables a cloud computing function and a service environment, and a network for edge computing may be deployed near the UE. Edge computing offers advantages, such as reduced latency, increased bandwidth, reduced backhaul traffic, and prospects for new services over cloud environments. The 5G- or 6G- or its subsequent-generation core network CN proposed by the 3rd generation partnership project (3GPP) may expose network information and functions to edge computing applications (hereinafter, edge applications).

The disclosure relates to technology for mobile edge computing in which the UE establishes a data connection to an edge data network (EDN) located close to the UE to make use of a broadband service and accesses the edge application server (EAS) driven on the edge computing platform or the edge hosting environment operated by the edge enabler server (EES) of the edge data network (EDN) to thereby use data services.

FIG. 1 is a view illustrating a configuration of a communication system supporting edge computing (hereinafter, an "edge computing system") according to an embodiment of the disclosure.

Referring to FIG. 1, an edge data network (EDN) 150 includes an edge application server (EAS) 155 and an edge enabler server (EES) 153. In FIG. 1, an edge configuration server (ECS) 151 provides configuration information related to the edge data network (EDN) 150. The edge application server (EAS) 155, the edge enabler server (EES) 153, and the edge configuration server (ECS) 151 interact with the core network 130 to provide edge computing services to the UE 110. The core network 130 may use, e.g., a 3GPP-based 5G or 6G or its subsequent next-generation core network. The UE 110 may include an application client 113 and an edge enabler client (EEC) 111. Although not shown, the UE 110 may further include an edge configuration client (ECC).

The functions of each entity in FIG. 1 are described. The edge enabler server (EES) 153 provides supporting functions necessary for the edge application server (EAS) 155 and the edge enabler client (EEC) 111. For example, the edge enabler server (EES) 153 may provide configuration information to the edge application server (EAS) 155 to enable exchange (transmission and reception) of application data traffic and provide information related to the edge application server (EAS) 155 to the edge enabler client (EEC) 111. The edge enabler client (EEC) 111 provides supporting functions necessary for the application client 113. For example, the edge enabler client (EEC) 111 retrieves configuration information to enable the exchange of application data traffic with the edge application server (EAS) 155 and provide the configuration information to the application client 113, and may search for the edge application server (EAS) 155 available in the edge data network (EDN).

In FIG. 1, the edge configuration server (EC S) 151 provides a supporting function necessary for the edge enabler client (EEC) 111 to connect to the edge enabler server (EES) 153. For example, the edge configuration server (EC S) 151 may provide, e.g., service area information and network address information (e.g., uniform resource identifier (URI)) for connecting the edge enabler client (EEC) 111 to the edge enabler server (EES) 153. The edge configuration server (ECS) 151 may be deployed in the communication service provider's mobile network operator (MNO) domain or the service provider's 3rd party domain. The application client 113 is installed in the UE 110 to perform functions as a client and supports transmission and reception of application data traffic between the UE 110 and the edge application server (EAS) 155. The edge application server (EAS) 155 performs functions as a server for transmitting and receiving data traffic in the edge data network (EDN). Although FIG. 1 illustrates one edge application server (EAS) 155, one edge enabler server (EES) 153, and one edge configuration server (EC S) 151 for convenience, each may be constituted of multiple servers.

In FIG. 1, EDGE-1 to EGGE-8 mean network interfaces (i.e., reference points) between entities and are described in Table 1 below. However, EDGE-1 to EGGE-8 are not limited to the descriptions in Table 1.

TABLE 1

| Reference Points | Description |
| --- | --- |
| EDGE-1 | EDGE-1 reference point enables interactions between the Edge Enabler Server and the Edge Enabler Client. It supports:<br>a) registration and de-registration of the Edge Enabler Client to the Edge Enabler Server;<br>b) retrieval and provisioning of Edge Application Server configuration information; and |

TABLE 1-continued

| Reference Points | Description |
|---|---|
| | c) discovery of Edge Application Servers available in the Edge Data Network. |
| EDGE-2 | EDGE-2 reference point enables interactions between the Edge Enabler Server and the 3GPP Core Network. It supports access to 3GPP Core Network functions and APIs for retrieval of network capability information. |
| EDGE-3 | EDGE-3 reference point enables interactions between the Edge Enabler Server and the Edge Application Servers. It supports: a) registration of Edge Application Servers with availability information (e.g., time constraints, location constraints); b) de-registration of Edge Application Servers from the Edge Enabler Server; c) providing access to network capability information (e.g., location information). |
| EDGE-4 | EDGE-4 reference point enables interactions between the Edge Configuration Server and the Edge Enabler Client. It supports provisioning of Edge configuration information to the Edge Enabler Client. |
| EDGE-5 | EDGE-5 reference point enables interactions between Application Client(s) and the Edge Enabler Client. |
| EDGE-6 | EDGE-6 reference point enables interactions between the Edge Configuration Server and the Edge Enabler Server. It supports registration of Edge Enabler Server information to the Edge Configuration Server. |
| EDGE-7 | EDGE-7 reference point enables interactions between the Edge Application Server and the 3GPP Core Network. It supports access to 3GPP Core Network functions and APIs for retrieval of network capability information. |
| EDGE-8 | EDGE-8 reference point enables interactions between the Edge Configuration Server and the 3GPP Core Network. |

Figure 2:
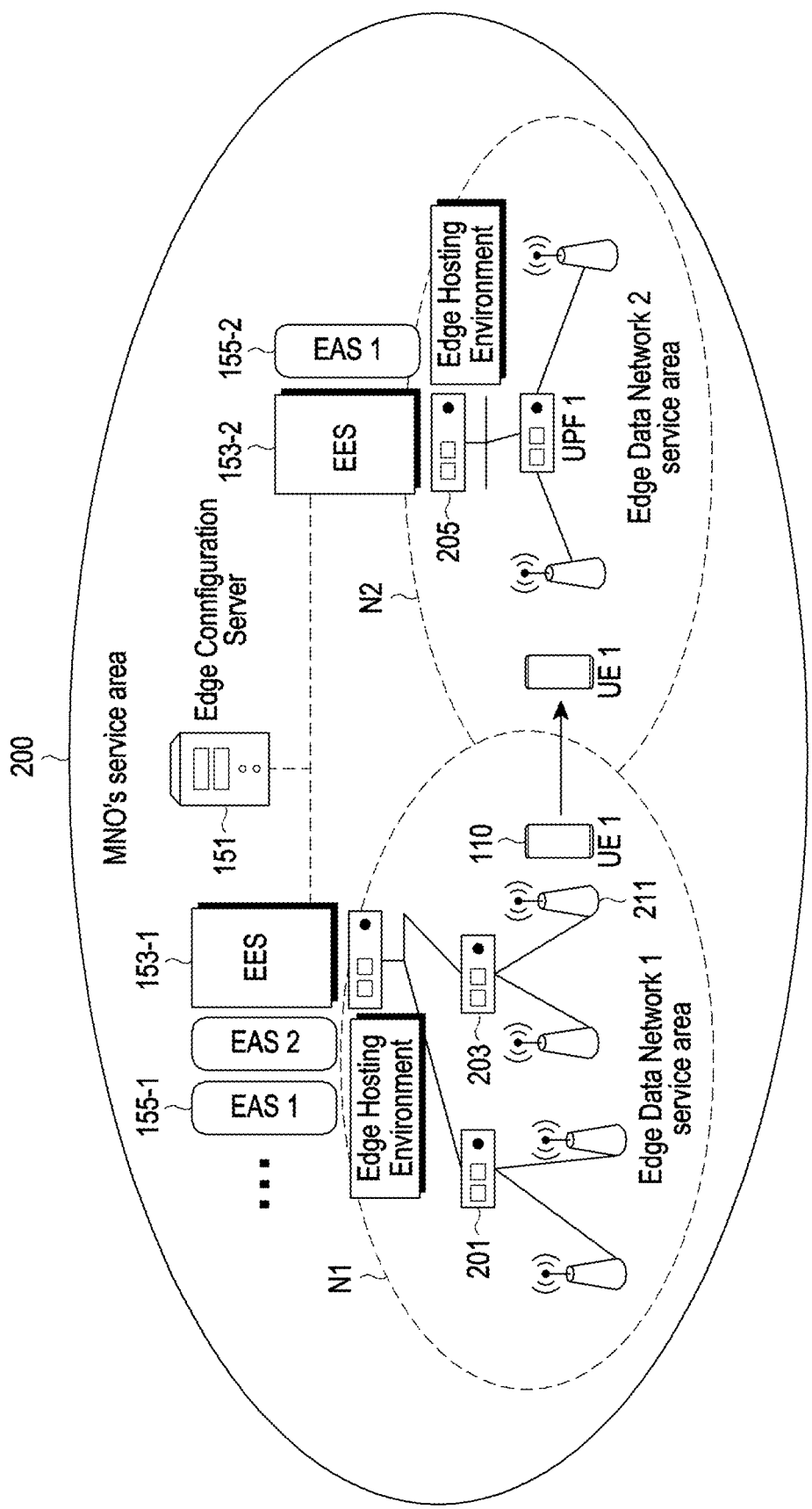
FIG. 2 is a view illustrating an example configuration of an edge computing system according to an embodiment of the disclosure.

FIG. 2 illustrates an example configuration of an edge computing system according to an embodiment of the disclosure. In FIG. 2, an MNO service area 200 indicates an example MNO domain of the communication service provider supporting an edge computing service.

The network and edge computing entities illustrated in FIG. 2 are described below. User plane functions (UPF) (UPF1, UPF2, . . . ) 201, 203, and 205 serve as a gateway through for transferring packets transmitted and received by the UE 110. To support an edge computing service, edge enabler servers (EES) 153-1 and 153-2 may be located near the UPFs 201, 203, and 205. The UPFs 201, 203, and 205 may perform low-latency transmission by directly transferring data packets to edge data networks (EDN) N1 and N2 without passing through the Internet, which is an external network. Further, the UPF may be connected to a data network connected to the Internet.

As described in connection with FIG. 1, the edge computing system includes an edge configuration server (ECS) 151, edge enabler servers (EES) 153-1 and 153-2 (153), edge application servers 155-1 and 155-2 (155), and an edge enabler client (EEC). The edge enabler servers (EES) 153-1 and 153-2 (153) configure an edge hosting environment (or edge computing platform) and have information about the edge application servers (EAS) 155-1 and 155-2 (155) running in the edge hosting environment.

In FIG. 2, the edge enabler servers (EES) 153-1 and 153-2 (153) communicate with the UE 110 through an access point 211, e.g., a base station, thereby connecting the application client 113 of the UE 110 with the edge application servers (EAS) 155-1 and 155-2 (155) in the edge hosting environment. The UE 110 supporting the edge computing system may include an edge enabler client (EEC) 111, and the communication with the edge enabler servers (EES) 153-1 and 153-2 (153) may be performed through interworking between the edge enabler client (EEC) 111 and the edge enabler servers (EES) 153-1 and 153-2 (153). The layer where the interworking is performed may be referred to as an edge enabling layer. The UE 110 referred to in the disclosure may be not only a smartphone, but also an IoT device or a vehicle, as described above.

In FIG. 2, the edge configuration server (ECS) 151 has deployment information for the edge enabler servers (EES) 153-1 and 153-2 (153) and functions to transfer configuration information for using the edge computing service to the UE 110. The configuration information may include at least one of edge data network (EDN) connection information (e.g., data network name or single-network slice selection assistance information (S-NSSAI)) (S-NSSAI is an identifier for identifying the network slice in the 5G system), edge data network (EDN) service area information (e.g., cell list, list of tracking area (TA), public land mobile network (PLMN) ID), edge enabler server (EES) connection information (e.g., URI). The configuration information may also include information indicating which layer the edge data network (EDN) 150 is present on, which includes the edge enabler server (EES) 153 and providing the edge computing service if the edge computing network is hierarchically configured. As an example, the layer may be determined depending on the data transmission distance between the UE 110 and the edge data network (EDN) 150 and may be selected based on various criteria according to, e.g., the type of the service to be used by the UE, subscriber information, and network operator's policy.

The EDN service areas N1 and N2 may be area in which the edge enabler server (EES) is available, as set by the edge enabler servers (EES) 153-1 and 153-2 (153). Based on this, when there are multiple edge enabler servers (EES), the UE 110 may receive information about the edge enabler server (EES) accessible in a specific location from the edge configuration server (ECS) 151. Further, if the edge configuration server (ECS) 115 may obtain information about the edge application servers (EAS) 155-1 and 155-2 (155) running in the edge hosting environment of a specific edge enabler server (EES), the UE 110 may obtain the corresponding edge application server (EAS) information through the edge enabler client (EEC) 111.

The edge application server (EAS) 155 may be a third party application server running in the edge computing system and, as the edge application server runs on the infrastructure provided by the edge hosting environment and is able to provide an edge computing service in a location close to the UE 110, the edge application server may provide ultra-low latency services. Information about an upper layer of a service provided by the edge application server (EAS) 155 to the UE 110 may be referred to as an application context. For example, when the user uses a real-time game application, all information necessary to regenerate the screen the user is currently viewing in the game and the play stage may be included in the application context.

The UE 110 may include an application client 113, an edge enabler client (EEC) 111 for interworking for the edge computing service for data traffic transmission/reception between the application client 113 and the edge application server (EAS) 155, and a mobile termination (MT) function for access and wireless communication in the wireless communication system. The application client 113 is an application provided by a third party and refers to a client application program that is driven in the UE 110 for a specific application service. Several applications may be driven in the UE 110. At least one of these applications may use the edge computing service. The edge enabler client (EEC) 111 refers to a client that performs operations in the UE 110 required to use the edge computing service. The edge enabler client (EEC) 111 may determine what applications may use the edge computing service and perform the operation of connecting a network interface to allow the data from the application client 113 to be transferred to the edge application server (EAS) 155 providing the edge computing service. The operation for establishing a data connection for using the edge computing service in the UE 110 may include the operation of establishing a wireless connection for data communication in a 3GPP-based communication system, registering the UE 110 in the wireless communication system, and transmitting/receiving data.

Figure 3:
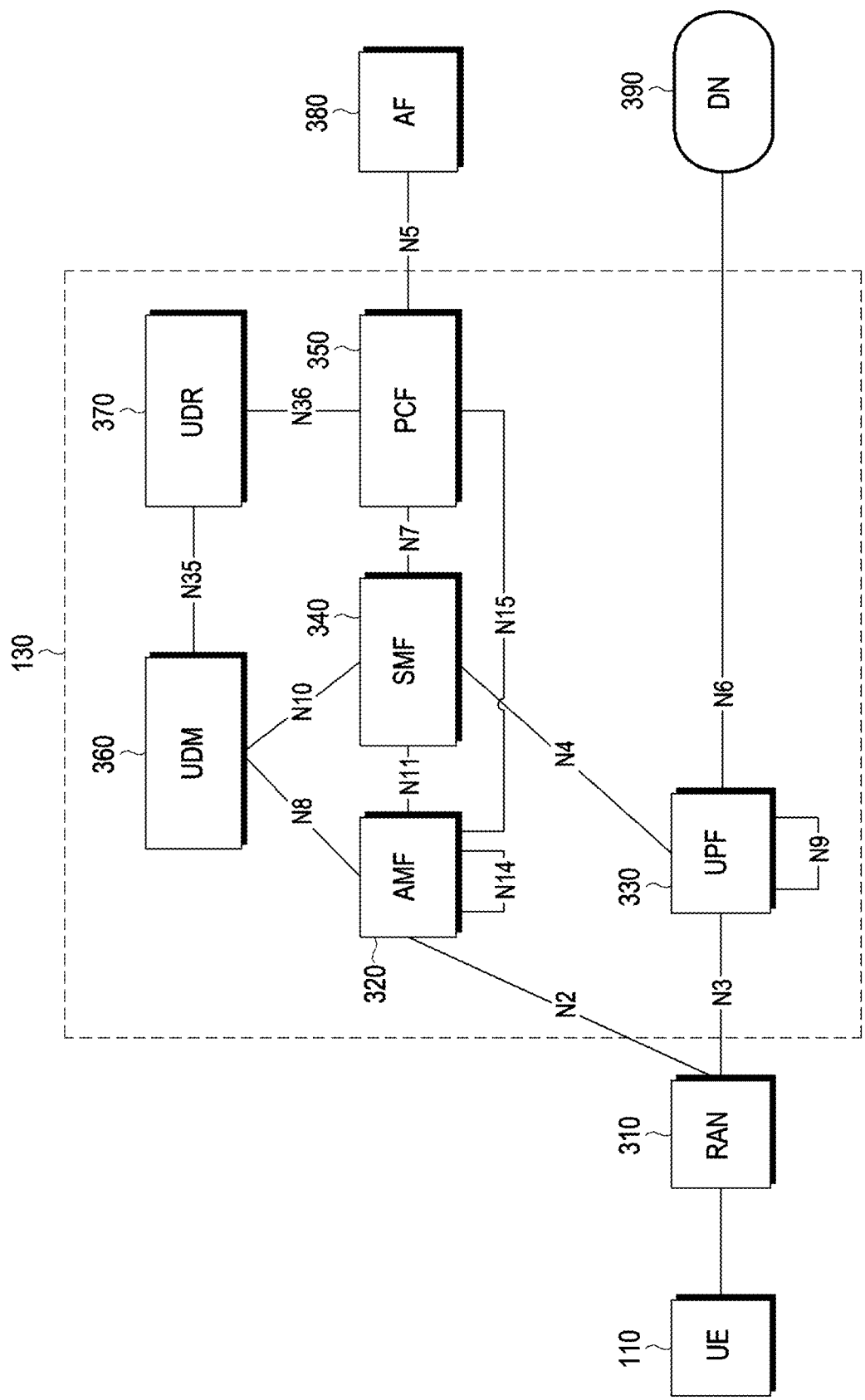
FIG. 3 is a view illustrating an example configuration of a 3GPP core network 130 according to an embodiment of the disclosure.

FIG. 3 is a view illustrating an example configuration of a 3GPP core network 130 according to an embodiment of the disclosure. The 3GPP core network 130 of FIG. 3 exemplifies the configuration of the core network of a 3GPP-based 5G system.

Referring to FIG. 3, the core network 130 may include, e.g., an access and mobility management function (AMF) 320, a user plane function (UPF) 330, a session management function (SMF) 340, a policy control function (PCF) 350, a user data management (UDM) 360, and a UDR unified data repository (UDR) 370. Reference characters denoted by Nx in FIG. 3, such as N2, N3, . . . , etc., indicate known interfaces between network functions (NFs) in the 3GPP core network 130, and the relevant descriptions may be found in the standard specifications (TS 23.501). Therefore, a detailed description will be omitted. In FIG. 3, the UE 110 may access the core network 130 through the base station 310 which is a 3GPP radio access network. The UE 110 may be connected with the AMF 320 through an N2 interface and the base station 310 and may be connected with the UPF 330 through an N3 interface.

In FIG. 3, the AMF 320 is an NF that manages wireless network access and mobility for the UE 110. The SMF 340 is an NF that manages the session for the UE. The session information may include quality of service (QoS) information, billing information, and information about packet processing. The UPF 330 is an NF processing user traffic (user plane traffic) and is controlled by the SMF 340. The PCF 350 is an NF that manages operator policy for providing a service in the wireless communication system. The UDM 360 is an NF that stores and manages subscriber information (UE subscription) about the UE 110 (hereinafter, UE subscription information). The UDR 370 is an NF that stores and manages data and may use the UE subscription information stored in the UDR 150. The UDR 370 may store the UE subscription information and may provide the UDM 360 with the UE subscription information. Further, the UDR 370 may store operator policy information and may provide operator policy information to the PCF 350.

In connection with the embodiments of the disclosure described below, the application function (AF) 380 in FIG. 3 may be the edge configuration server (ECS) 151 described in connection with FIG. 2 that provides configuration information in the edge computing system. The data network (DN) in FIG. 3 may be the edge data network (EDN) 150 including the edge enabler server (EES) 153 and the edge application server (EAS) 155 described in connection with FIG. 2. A network exposure function (NEF) (not shown in FIG. 3) for edge computing may be included in the core network 130. The NEF may exchange (transmit/receive) a message(s) for edge computing according to embodiments of the disclosure between the AF 380 and the UDM 360/ UDR 370. Further, the NEF may be connected with at least one of the AMF, SMF, PCF, and AF through an interface. Further, the NEF may communicate with a short message service-service center (SMS-SC) for data transfer using a short message service (SMS) to the UE 110.

In embodiments of the disclosure, when transfer of an SMS message for edge computing to the UE 110 is required, information related to edge computing is transferred from the AF 380 (e.g., the ECS 151) to the NEF, and an SMS message including trigger information, which indicates a change in, e.g., the configuration information, may be transferred to the UE 110 from an SMS-SC (not shown) which receives the trigger information from the NEF, through the SMS function (SMSF) and the AMF 340. The process of transferring the SMS message from the SMS-SC to the UE 110 may use a known operation and may refer to section 4.13.3.6 of 3GPP TS 23.502. Each component described in connection with the network configuration of FIG. 3 may be referred to by various names, such as a network entity, a network node, a network device, or an NF. Further, each or two or more of the components of the core network 130 in FIG. 3 and the components of the edge computing system of FIG. 1 may be implemented as at least one server.

Hereinafter, in embodiments of the disclosure, provided embodiments are various methods in which when a wireless communication system supporting edge computing changes (generates, adds, or deletes) configuration information about the EDN (e.g., at least one of data network name (EDN DNN), network slice information (e.g., S-NSSAI information), EDN service area information, EES address information or EES registered EAS information) in the edge computing server (e.g., ECS or EES), the changed configuration information is provided to the UE. The changed configuration information may be referred to as updated configuration information. Also provided embodiments are various methods for allowing the UE to connect to the network to transfer the changed configuration information and triggering transmission, to the network, of a request for the EEC in the UE to receive the changed configuration information.

When edge computing server (e.g., ECS or EES) supports a notification service according to a change in the edge application information and EDN configuration, a keep-alive operation may be required to maintain the connection between the UE and the edge computing server, and additional power consumption may occur in the UE. To address the power consumption issue, a method is needed to be able to transfer the changed edge computing-related information to the UE without keep-alive operation.

To that end, in embodiments of the disclosure, described below in detail are (1) a method in which the edge computing server (e.g., ECS or EES) transfers information necessary for triggering the operation of the EEC in the UE (i.e., information required for triggering) to the 3GPP network function, (2) a method in which the 3GPP network function (e.g., PCF, AMF, SMF, or UDM) transfers the information received from the edge computing server (e.g., ECS or EES) to the UE, and (3) a method for specifying the EEC in the UE to which information transmitted from the edge computing server (e.g., ECS or EES) is to be transferred. According to embodiments of the disclosure described below, since no keep-alive operation is required to maintain connection between the UE and the edge computing server, the UE may receive the updated information from the edge computing server even without additional power consumption. The keep-alive operation means the operation of transmitting/receiving a message at each predetermined time between devices (network entities) to identify whether the data link properly operates between communication-connected devices (network entities) or to prevent disconnection of the data link. Accordingly, the keep-alive operation may increase the power consumption in the UE.

In embodiments of the disclosure below, the basic operations and descriptions of the entities, e.g., ECS and EEC, in the edge computing system, and the entities, e.g., SMS-SC, UDM, UDR, PCF, AMF, SMF, and NEF, in the 3GPP core network, are the same as the description made above in connection with FIGS. 1 to 3 and a detailed description thereof is thus omitted.

Figure 4:
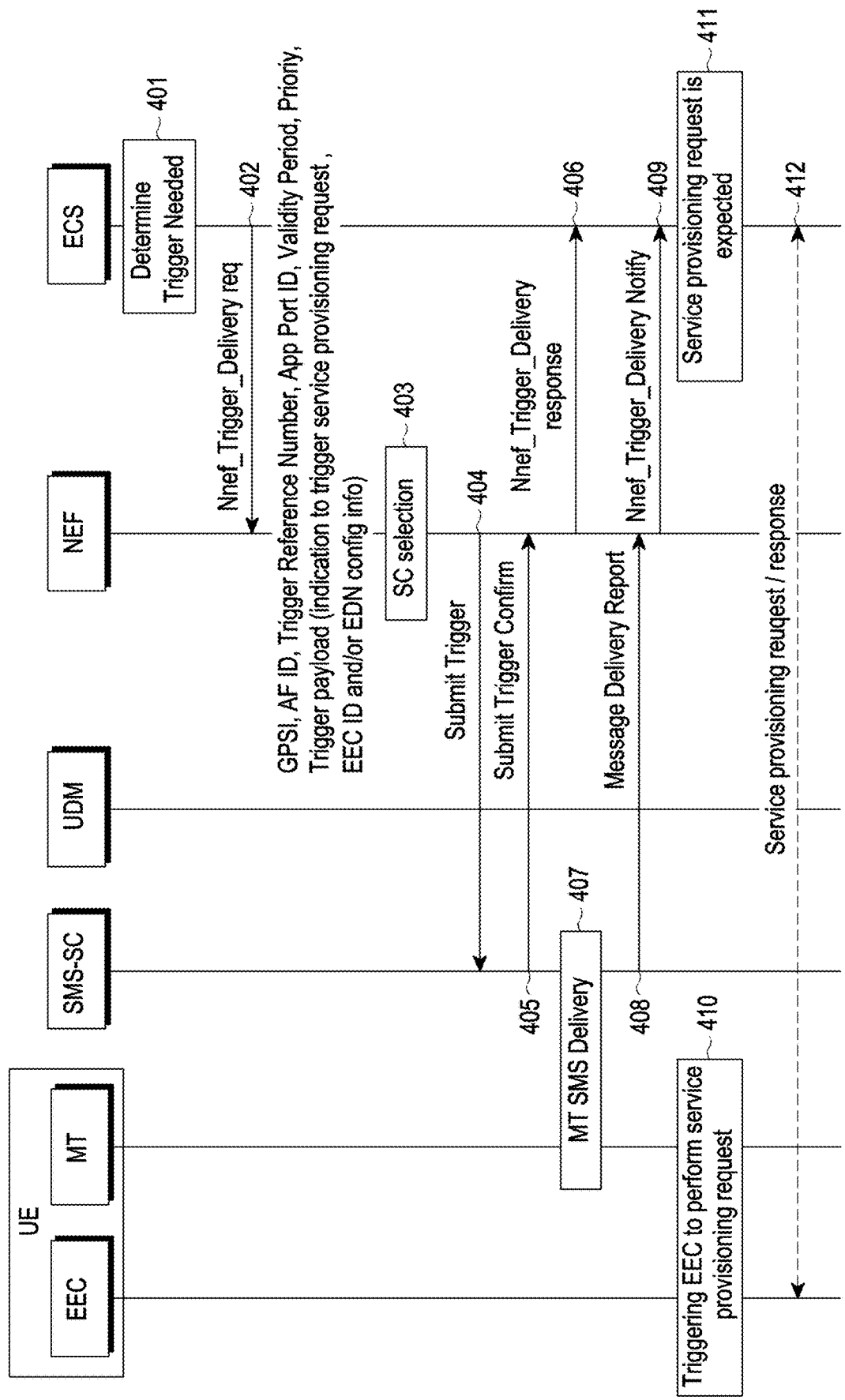
FIG. 4 is a flowchart illustrating an EEC triggering procedure using an SMS in a wireless communication system supporting edge computing according to an embodiment of the disclosure.

FIG. 4 is a flowchart illustrating an EEC triggering procedure using an SMS in a wireless communication system supporting edge computing according to an embodiment of the disclosure.

Referring to FIG. 4, in operation 401, a change (e.g., generation, addition, or deletion) of EDN configuration information (e.g., at least one of EDN data network name (DNN), network slice information (e.g., S-NSSAI information), EDN service area information, EES address information or EES registered EAS information) may be detected. In order for the ECS to provide the changed configuration information to the UE, a service provisioning request is required from the UE, and the ECS determines that it is necessary to trigger the UE to transmit the request message. In embodiments of the disclosure below, it is assumed that a keep-alive operation for maintaining connection between the UE and the edge computing server (ECS or EES) is not required for the UE to reduce power consumption. In operation 402, the ECS requests the NEF for edge computing to transfer information for EEC triggering, using Nnef_Trigger_Delivery among the services provided by the NEF so as to provide the changed configuration information to the UE. The Nnef_Trigger_Delivery service is a service that requests the UE to transmit a trigger. For a basic description of the Nnef_Trigger_Delivery service, refer to the TS 23.502 standard. The changed configuration information may or may not be included in the information for EEC triggering. The operation of the UE depending on whether the changed configuration information is included in the information for EEC triggering is described below.

The information for EEC triggering may include at least one of information a1) to a7) below:
a1) EEC port ID (e.g., port number);
a2) indication to trigger EEC;
a3) EEC ID;
a4) UE ID (generic public subscription identifier (GPSI));
a5) changed EDN configuration information (DNN, S-NSSAI, etc.);
a6) EES profile information (EES endpoint address, connected EAS information, etc.); and/or
a7) ECS information (e.g., ECS address).

Upon receiving the message for requesting the Nnef_Trigger_Delivery service, the NEF selects an SMS-SC that may play the role of authenticating ECS and generating and transferring an SMS message in operation 403. Specifically, the NEF may obtain an intra-network use identifier corresponding to the UE ID received from the ECS in conjunction with the UDM to select an SMS-SC, obtain information about an SMS-SC capable of providing a service to the UE based on the obtained identifier, and perform SMS-SC selection. Thereafter, in operation 404, the NEF transmits, to the SMS-SC, information for EEC triggering to be included and transferred in the SMS message (e.g., at least one of the EEC port ID, indication to trigger EEC, EEC ID, and changed EDN configuration information among the information received from the ECS in operation 402). The information for EEC triggering means information for triggering transmission of a service provisioning request to the ECS by the EEC in the UE. In operation 405, the SMS-SC sends a response acknowledging reception of the information for EEC triggering to the NEF.

In operation 406, if receiving the response from the SMS-SC, the NEF notifies the ECS that the information for EEC triggering has been transferred to the SMS-SC. This is a response to the Nnef_Trigger_Delivery request in operation 402. In operation 407, the SMS-SC configures/creates an SMS message based on the information for EEC triggering received in operation 404 and transfers the SMS message to the UE by NAS signaling to the terminal. The SMS message may include at least one of the information exemplified as information for the EEC triggering. After successfully transmitting the SMS message to the UE, the SMS-SC transmits, to the NEF, a message delivery report informing of the same in operation 408. In operation 409, the NEF transmits the Nnef_Trigger_Delivery Notify message to the ECS, thereby notifying the ECS whether transmission of the SMS message including the information for EEC triggering has succeeded.

Meanwhile, upon receiving the SMS message including the information for EEC triggering, the UE may identify the EEC ID and EEC port ID included in the SMS message to thereby specify the EFC in the UE, to which the information included in the SMS message is to be transferred, and transfer the received information to the EEC, performing EEC triggering in operation 410. The UE may use multiple EECs according to application(s) and may uniquely identify each EEC based on the port ID (EEC port ID) allocated to the EEC or the EEC ID. The EEC in the UE determines an operation depending on the information included in the SMS message. When the SMS message includes the "indication to trigger EEC" information according to the disclosure, in operation 412, the EEC in the UE transmits a service provisioning request to the ECS according to the ECS address information included in the received SMS message. The ECS that has received the service provisioning request transmits a service provisioning response to the UE. If the received SMS message includes the changed EDN configuration information, the EEC does not transmit the service provisioning request but may select a new EES or create/modify/release the PDU session using the changed EDN configuration information.

Further, in an embodiment of the disclosure, the following operations 1-1) and 1-2) for ensuring that the ECS may know the latest EEC port ID may be performed.

In one example of 1-1, a range of port IDs (port numbers) allocated to the EEC in the UE is designated, and a different port ID is allocated for each EEC. If it is impossible to allocate a different port ID for each EEC, the ECS includes the EEC ID in the information for EEC triggering sent to the EEC.

In one example of 1-2, upon changing the RFC port ID, the EEC transfers the changed EEC port ID to the ECS (EEC may transfer the changed EEC port ID through a service provisioning request or may provide the changed EEC port ID and RFC ID to the ECS using a separate procedure). The ECS that has detected a change in the EEC port ID may transfer the changed information to the SMS-SC, updating the information stored in the SMS-SC processing the SMS message.

Figure 5:
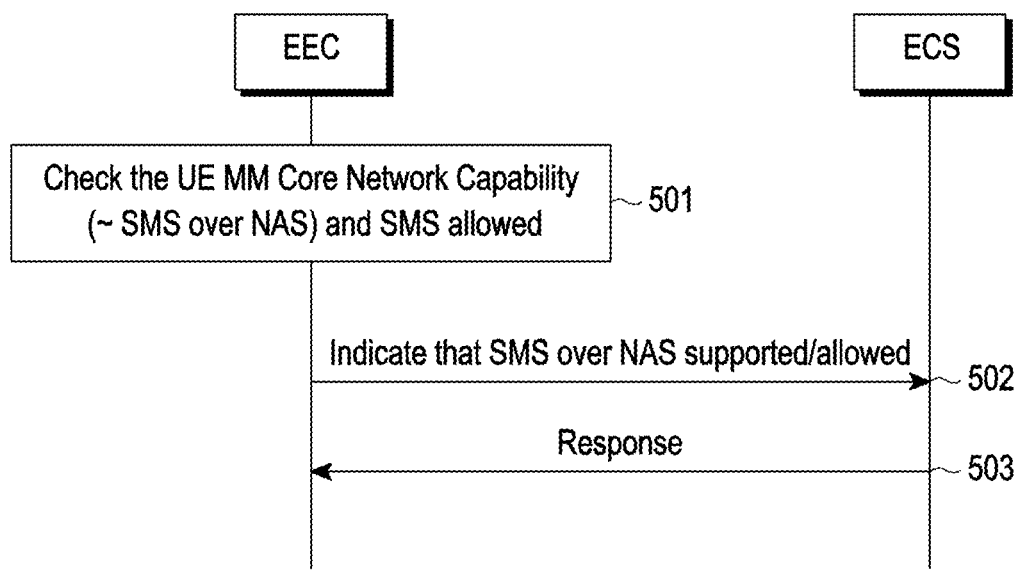
FIG. 5 is a flowchart illustrating operations between an EEC and an ECS for using an SMS in a wireless communication system supporting edge computing according to an embodiment of the disclosure.

FIG. 5 is a flowchart illustrating operations between an EEC and an ECS for using an SMS in a wireless communication system supporting edge computing according to an embodiment of the disclosure.

Referring to FIG. 5, in operation 501, the EEC in the UE may identify the UE network capability information (e.g., UE mobile management (MM) core network capability in the 3GPP standard), thereby identifying whether SMS over non-access-stratum (NAS) for the UE is allowed. Specifically, it is possible to identify whether the UE has capability for SMS over NAS and whether SMS over NAS is allowed from the network. If SMS over NAS is allowed, in operation 502, the EEC transmits indication information informing the ECS that the UE's SMS over NAS is allowed to be used (indication of SMS over NAS supported/allowed). This operation may be performed after the EFC in the UE identifies that SMS over NAS is allowed. For example, the UE may identify whether an indication that SMS over NAS is allowed is received from the 3GPP network through a UE configuration update command defined in the 3GPP standard. Upon receiving, from the EEC, the indication that SMS over NAS service is allowed in operation 502, the ECS stores the information and sends a response message to the UE in operation 503. The response message may include information indicating whether EEC triggering service using SMS over NAS from ECS is possible.

In a state in which the SMS over NAS service for the UE is unavailable, the UE may receive an SMS indication informing the UE that the SMS over NAS is available from the AMF through the UE configuration update command. Upon receiving the indication, the UE notifies that the SMS over NAS is available to the EEC in the higher layer, and the EEC may notify the EC S that the SMS over NAS is available.

In an embodiment of the disclosure, a method for the EEC to notify the EC S that SMS over NAS is available may include at least one of methods 2-1) and 2-2) below.

In one example of 2-1, after the EEC in the UE learns the SMS indication of "SMS over NAS available" through the UE configuration update command received from the network, the EEC may inform the ECS of the fact (e.g., sends, to the ECS, a service provisioning request including information indicating "SMS over NAS available").

In one example of 2-2, the 3GPP network may directly inform the ECS of this fact using the network exposure function. To that end, the ECS may request the network exposure function to monitory and notify of the SMS over NAS availability state. For the request, the network exposure function may provide SMS over NAS availability application programming interface (API) to the ECS, and the ECS may perform the subscription operation for the monitoring and notification service while providing the UE ID to the network exposure function using the same.

Further, upon receiving the information indicating "SMS over NAS available" through the SMS indication IE in the UE configuration update command, the UE may perform a normal UE configuration update procedure and then perform a registration procedure for mobility and periodic registration update according to 3GPP TS 24.501, thereby requesting use of SMS over NAS.

Figure 6:
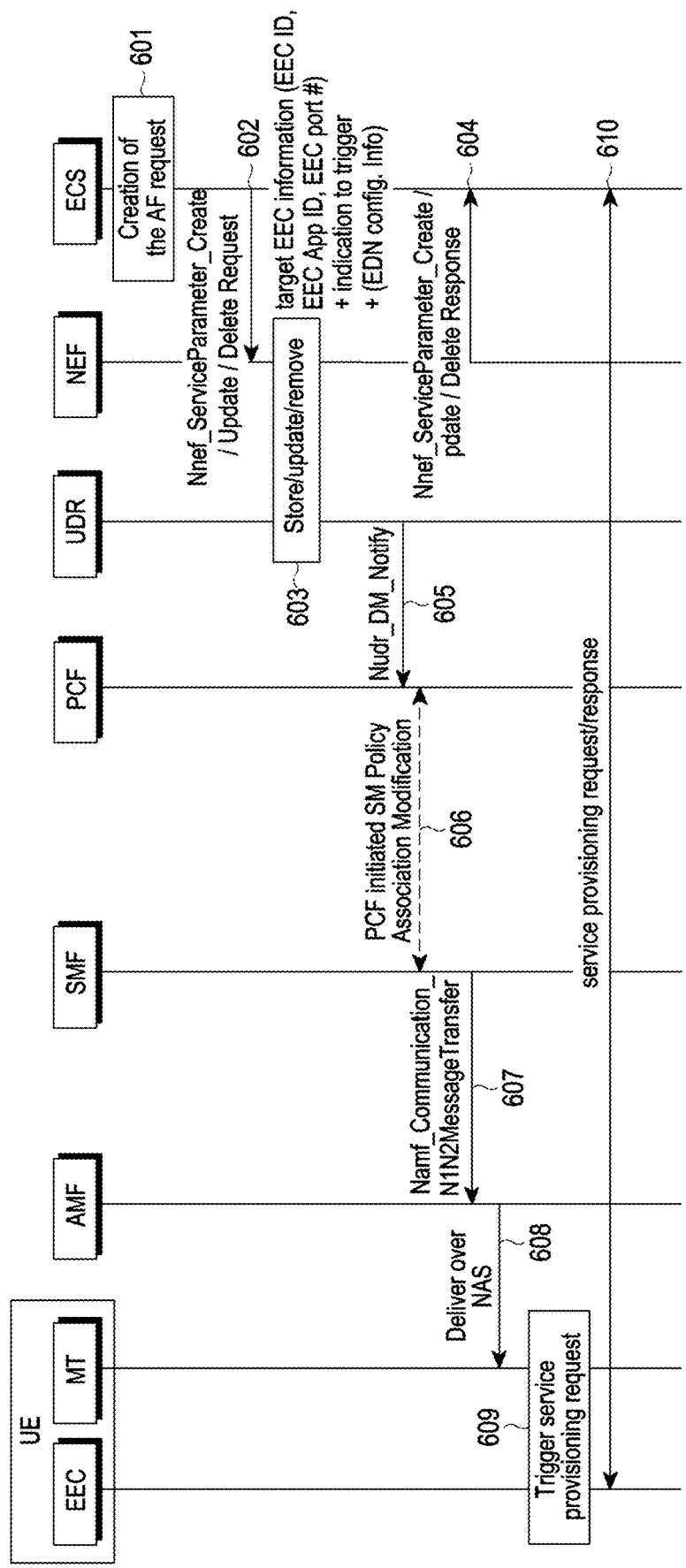
FIG. 6 is a flowchart illustrating an EEC triggering procedure using a PCO in a wireless communication system supporting edge computing according to an embodiment of the disclosure.

FIG. 6 is a flowchart illustrating an EEC triggering procedure using a protocol configuration option (PCO) in a wireless communication system supporting edge computing according to an embodiment of the disclosure. The PCO may include application-related configuration information and protocol-related information related to the UE as a portion of the NAS message.

Referring to FIG. 6, in operation 601, the ECS detects a change (e.g., generation, addition, or deletion) of EDN configuration information (e.g., at least one of EDN data network name (DNN), network slice information (e.g., S-NSSAI information), EDN service area information, EES address information or EES registered EAS information) and generates an application function (AF) request to notify the UE of it. In order for the ECS to provide the changed configuration information to the UE, a service provisioning request is required from the UE, and the ECS may request transfer of information for RFC triggering for the UE to transmit the request message. Upon detecting a change in, e.g., configuration information in operation 601, in operation 602, the ECS requests the NEF for edge computing to transfer information for EEC triggering using Nnef_ServiceParameter among the services provided by the NEF. For a basic description of the Nnef_ServiceParameter, refer to the TS 23.502 standard. The request message in operation 602 is the information for EEC triggering and may include at least one of the information a1) to a7) described above in connection with the embodiment of FIG. 4.

If a direct connection between the ECS and the SMS-SC is supported, in operation 602, the ECS, not the NEF, may directly transfer the information for EFC triggering to the SMS-SC. In this case, the SMS-SC does not perform the operation to be described below but allows the information for EEC triggering to be transferred through the SMS over NAS as in the embodiment described above in connection with FIG. 4.

In operation 603, the NEF receives the information for EEC triggering and transfers the information to the UDR. The UDR includes the received information in the application data for the UE identified by the UE ID, stores it, and in operation 604, transfers, to the PCF, the information for EEC triggering using the Nudr_DM_Notify service (message), which notifies of a change in data, among the services provided by the UDR in TS 24.502. In operation 606, the PCF transfers the information for EEC triggering to the SMF. The information for EEC triggering is transferred to the SMF by session management (SM) policy-associated modification or creation, and the SMF allows the received information to be transferred to the UE through the PCO. In operation 607, the SMF transmits the PCO for transfer of the information for EEC triggering to the AMF so that the information for EEC triggering is transferred through the Namf_Communication_N1N2MessageTransfer service, which is a message transfer service using the N1 and/or N2 interface, among the services provided by the AMF and, in operation 608, the AMF transmits a NAS message including the PCO to the UE.

In operation 609, upon receiving the information for EEC triggering through the PCO, the UE may identify the EEC ID or EEC port ID from the information for EEC triggering, thereby specifying the EEC to which the "indication to trigger EEC" information for EEC triggering is to be transferred. Upon receiving the "indication to trigger EEC" information, the EEC may transmit a service provisioning request to the ECS using the ECS address included in the information for EEC triggering and receive the changed EDN configuration information from the ECS in operation 610. The operation of the EEC may vary according to the information included in the information for EEC triggering. When the "indication to trigger EEC" information is included in the information for EFC triggering, the EEC transmits the service provisioning request to the ECS. The ECS that has received the service provisioning request transmits a service provisioning response to the UE. If the information for EEC triggering includes the changed EDN configuration information, the EEC does not transmit the service provisioning request in operation 610 but may select a new EES or create/modify/release the PDU session using the changed EDN configuration information obtained from the information for EEC triggering.

Figure 7:
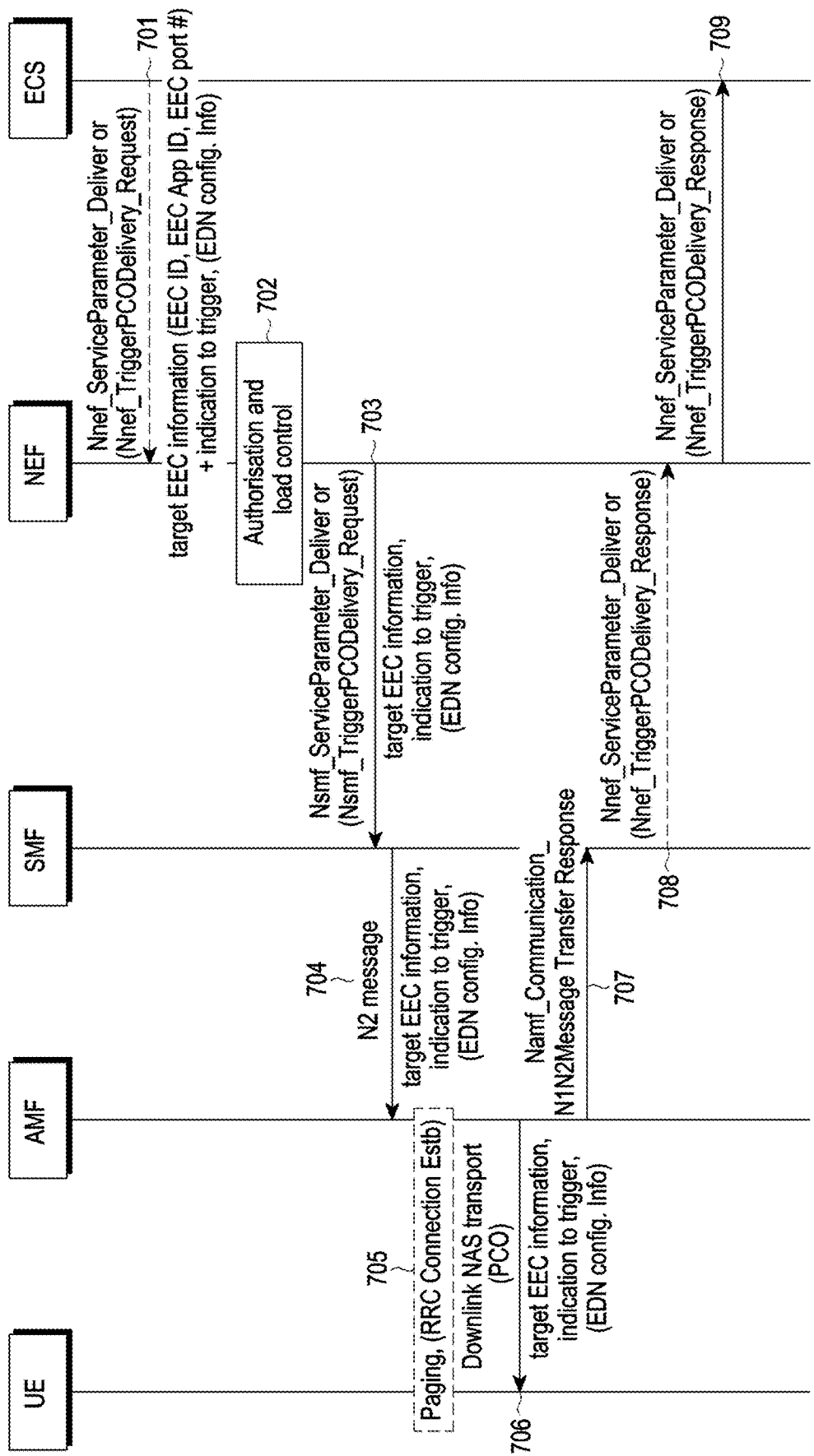
FIG. 7 is a flowchart illustrating an EEC triggering procedure using PCO in a wireless communication system supporting edge computing according to an embodiment of the disclosure.

FIG. 7 is a flowchart illustrating an EEC triggering procedure using PCO in a wireless communication system supporting edge computing according to an embodiment of the disclosure.

Referring to FIG. 7, in operation 701, the ECS may detect a change (e.g., generation, addition, or deletion) of EDN configuration information (e.g., at least one of EDN data network name (DNN), network slice information (e.g., S-NSSAI information), EDN service area information, EES address information or EES registered EAS information). To provide the changed configuration information to the UE, the ECS requests the NEF to transfer information for EEC triggering using the Nnef_ServiceParameter_Deliver service or the Nnef_TriggerPCODelivery service among the services provided by the NEF for edge computing. The Nnef_ServiceParameter_Deliver service is a service for allowing provision of a service parameter that may be used for the UE, and the Nnef_TriggerPCODelivery service is a service that requests the UE to transmit trigger information through the PCO. The information for EEC triggering may include at least one of the information a1) to a7) described above in connection with the embodiment of FIG. 4.

In operation 702, upon receiving the information for EEC triggering from the ECS, the NEF authorizes the request for transferring the information for EEC triggering from the ECS and performs load control. The load control in operation 702 may be an operation for determining whether to receive the load of the information to be transmitted by the ECS. If the size of the information to be transferred through the ECS is large, the ECS may determine that the load range that may be handled by the NEF is exceeded and perform an additional operation. For example, if the ECS wants to transfer EDN configuration information and EES profile information, but the information size exceeds the load range, only the indicator "indication to trigger EEC" information for inducing EEC triggering may be transmitted. In operation 703, the NEF requests the SMF to transfer the information for EEC triggering using the Nsmf_ServiceParameter_Deliver service or the Nsmf_TriggerPCODelivery service among the services provided by the SMF. In operation 704, the SMF transmits, to the AMF, a PCO including information for EEC triggering, using an N2 message, so that the information for EEC triggering is transferred through a message (N2 message) using the N2 interface among the services provided by the AMF. In operations 705 and 706, the AMF transmits the NAS message including the PCO to the UE. In this case, the AMF may perform paging to the UE if necessary. Thereafter, in operations 707 to 709, a response message is transmitted to the ECS via the AMF, SMF, and NEF that have transferred the information for EEC triggering to the UE.

Upon receiving the information for EEC triggering through the PCO, the UE may identify the EEC ID or EEC port ID from the information for EEC triggering and specify the EEC to which the information for EFC triggering is to be transferred. When the "indication to trigger EEC" information is included in the information for EEC triggering, the EEC transmits the service provisioning request to the ECS. If the information for EEC triggering does not include "indication to trigger EEC" information and the changed configuration information is directly received, the UE may create a new PDU session based on the changed configuration information or attempt to connect to a new EES or ECS.

Figure 8:
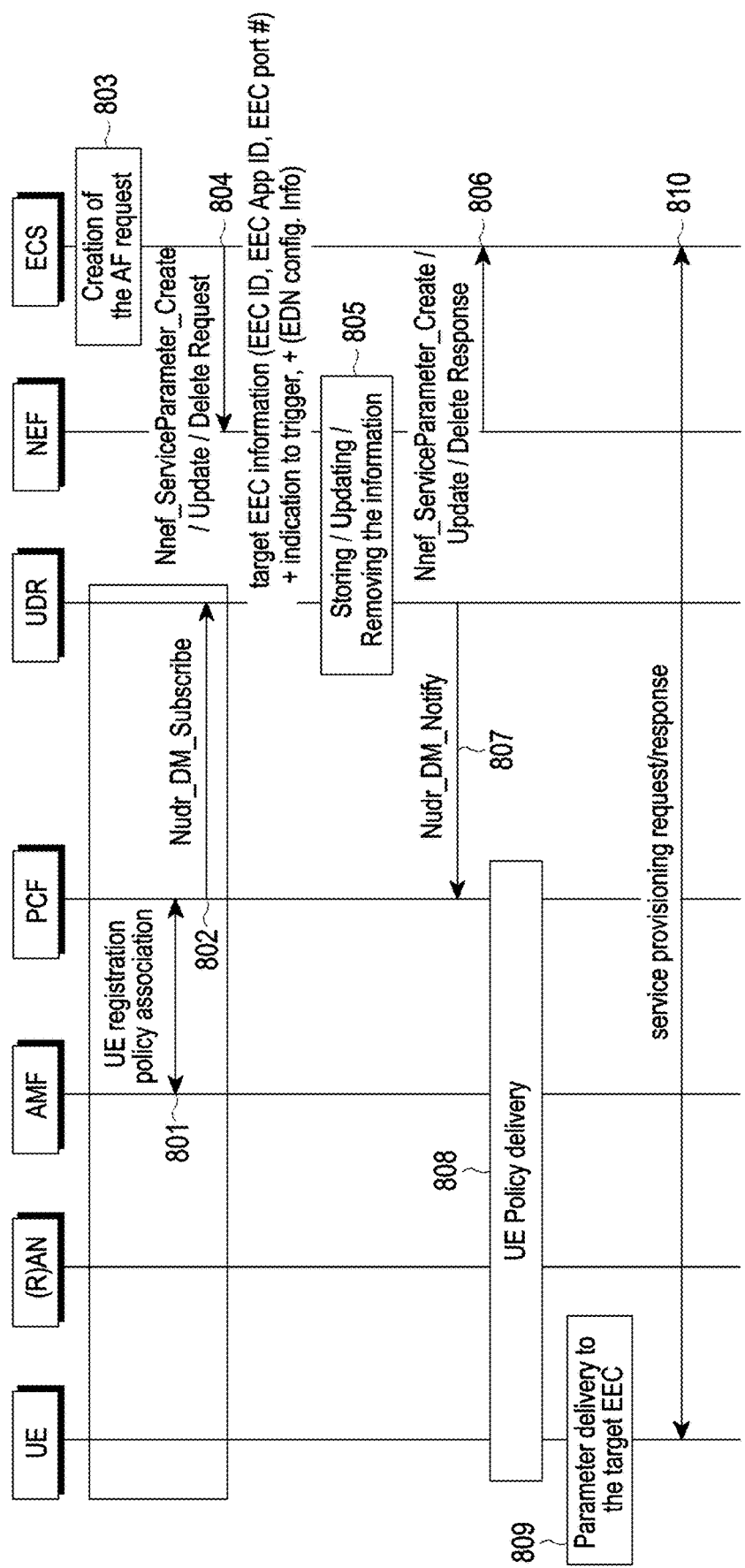
FIG. 8 is a flowchart illustrating an EEC triggering procedure using a UCU in a wireless communication system supporting edge computing according to an embodiment of the disclosure.

FIG. 8 is a flowchart illustrating an EEC triggering procedure using a UE configuration update (UCU) in a wireless communication system supporting edge computing according to an embodiment of the disclosure.

Referring to FIG. 8, in operation 801, UE policy association is performed between the AMF and the PCF (this operation may be performed during the UE registration procedure), and in operation 802, the AMF requests the UDR to subscribe for notification for the changed information in the UDR using the Nudr_DM_Subscribe service among the services provided by the UDR. In operation 803, the ECS detects a change (e.g., generation, addition, or deletion) of EDN configuration information (e.g., at least one of EDN data network name (DNN), network slice information (e.g., S-NSSAI information), EDN service area information, EES address information or EES registered EAS information) and generates an application function (AF) request to notify the UE of it. In order for the ECS to provide the changed configuration information to the UE, a service provisioning request is required from the UE, and the ECS may request transfer of information for EEC triggering for the UE to transmit the request message. In operation 804, to provide the changed configuration information to the UE, the ECS requests the NEF to transfer information for EEC triggering using the Nnef_ServiceParameter_Deliver among the services provided by the NEF for edge computing. For a basic description of the Nnef_ServiceParameter_Deliver service, refer to the TS 23.502 standard. The information for EEC triggering may include at least one of the information a1) to a7) described above in connection with the embodiment of FIG. 4.

In operation 805, the NEF may transfer information for EEC triggering to the UDR, and the UDR may include and store the received information in the application data for the UE identified by the UE ID (e.g., application data subset setting to "Edge computing service specific information). In operation 806, in response to the Nudr_DM_Subscribe service (message) from the PCF in operation 802, the UDR may transfer, to the PCF, the information for EEC triggering using the Nudr_DM_Notify service (message) for notifying of a change in data among the services provided by the UDR in TS 24.502. As such, the scheme in which the information for EEC triggering is transferred to the PCF may be transferred through a notification for the subscription performed on the UDR by the PCF in advance. To that end, if a change in the application data occurs in the UDR related to EEC triggering as in operation 802, the PCF may previously perform subscription for receiving a notification.

Thereafter, in operation 808, the PCF may transfer the information for EEC triggering received from the UDR to the AMF, and the AMF may transfer, to the UE, the information for EEC triggering using the UE policy deliver or user configuration update procedure in the 3GPP standard. In operation 809, the UE may identify the EEC ID or EEC port ID from the information for EEC triggering received through the UE configuration update procedure and specify the target EEC. In this case, the RFC in the UE may perform different operations depending on the information included in the information for EEC triggering. When the "indication to trigger EEC" information is included in the information for EEC triggering, the EEC transmits the service provisioning request to the ECS in operation 810. The ECS that has received the service provisioning request transmits a service provisioning response to the UE. If the information for EEC triggering includes the changed EDN configuration information, the EEC does not transmit the service provisioning request in operation 810 but may select a new EES or create/modify/release the PDU session using the changed EDN configuration information obtained from the information for EEC triggering.

Figure 9:
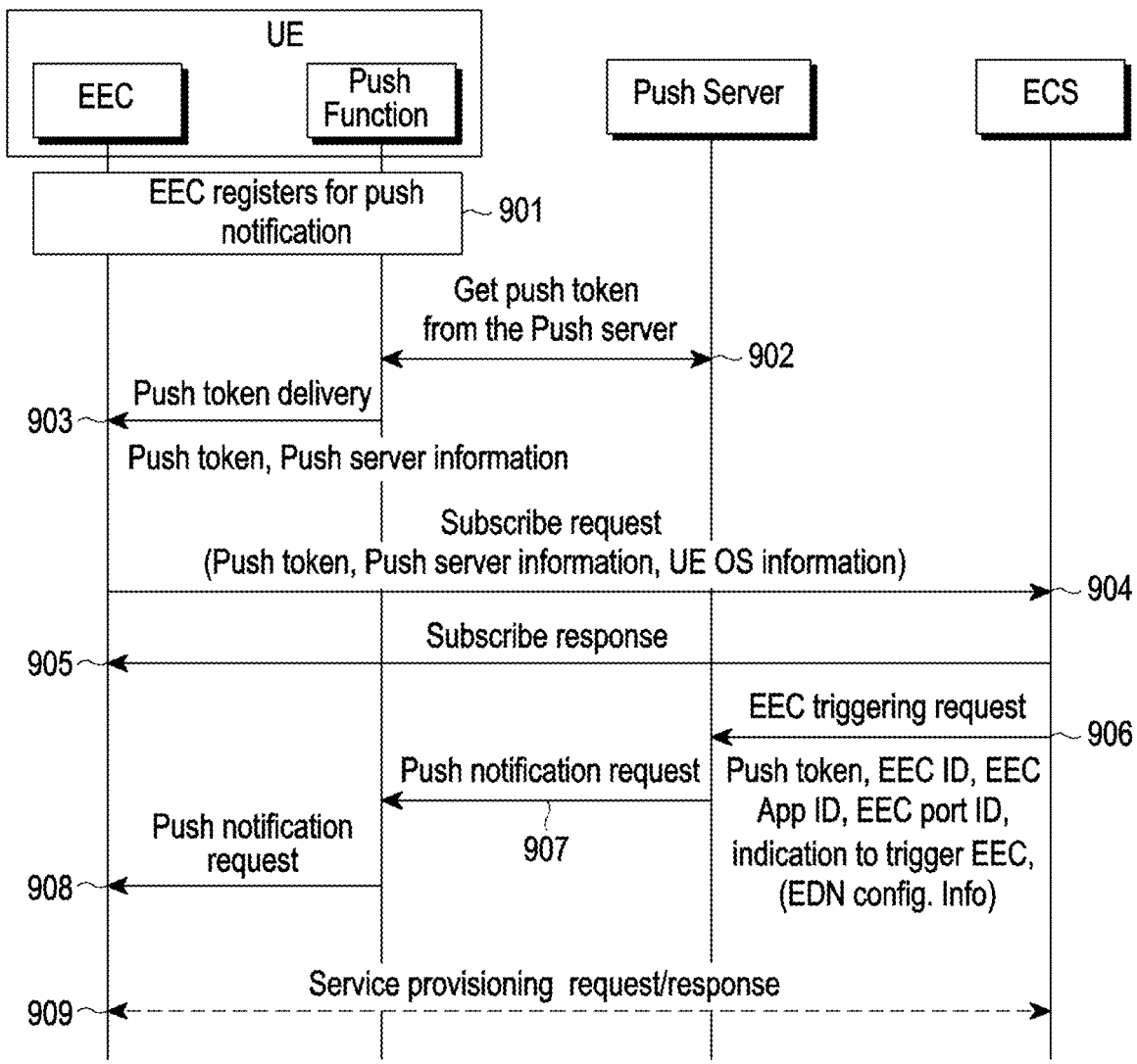
FIG. 9 is a flowchart illustrating an EEC triggering procedure using a push notification in a wireless communication system supporting edge computing according to an embodiment of the disclosure.

FIG. 9 is a flowchart illustrating an EEC triggering procedure using a push notification in a wireless communication system supporting edge computing according to an embodiment of the disclosure. In the embodiment of FIG. 9, the UE may include a push function for receiving a push notification with the EEC described in connection with FIG. 1.

Referring to FIG. 9, in operation 901, the EEC in the UE performs a use request and registration for the push function for receiving the push notification. In operation 902, the push function in the UE performs use registration of the push notification service with the push server and obtains a push token provided by the push server. Information about the push server may be previously locally configured in the UE or may be provided from the EEC. The push server may be co-located with the 3GPP core network and managed by the operator or may exist in an external network. In operation 903, the push function transfers the push token received from the push server and information about the selected push server (e.g., address information about the push server and size limit information about the notification message, etc.) to the EEC.

In operation 904, the EEC transmits a subscribe request message including the EEC ID or UE ID and the push token and push server information obtained in operation 903 to the ECS. Further, the EEC may transfer UE OS information together to the ECS if necessary. In operation 905, the ECS transmits a subscribe request message to the EEC in response thereto. The subscribe response message may include information about whether a push notification service is available. The ECS may identify whether the push server may be available for the UE based on the push server information received from the EEC in operation 904.

If the push server is available for the UE, in operation 906, the ECS requests the push server to transfer information for EEC triggering to transfer the changed EDN configuration information to the UE. In this case, the ECS may select a push server to which the information for EEC triggering is to be transferred based on the received push server information or UE OS information. The information for EEC triggering transmitted by the ECS to the push server may include at least one of information b1) to b8) below. The information b2) to b8) below is the same as the information a1) to a7) described above:

b1) push token (token provided by EEC);
b2) EEC port ID;
b3) indication to trigger EEC;
b4) EEC ID;
b5) UE ID (GPSI);
b6) changed EDN configuration information (DNN, S-NSSAI, etc.);
b7) EES profile information (EES endpoint address, connected EAS information, etc.); and/or
b8) ECS information (e.g., address).

In operation 907, the push server may transfer, to the UE, the information for EEC triggering received from the ECS using a push notification message, allowing EEC triggering to be performed. In operation 908, the EEC may perform different operations depending on the information included in the information for EEC triggering. When the "indication to trigger EEC" information is included in the information for EEC triggering, the EEC transmits the service provisioning request to the ECS in operation 909. The ECS that has received the service provisioning request transmits a service provisioning response to the UE. If the information for EEC triggering includes the changed EDN configuration information, the EEC does not transmit the service provisioning request in operation 909 but may select a new EES or create/modify/release the PDU session using the changed EDN configuration information obtained from the information for EEC triggering.

Figure 10:
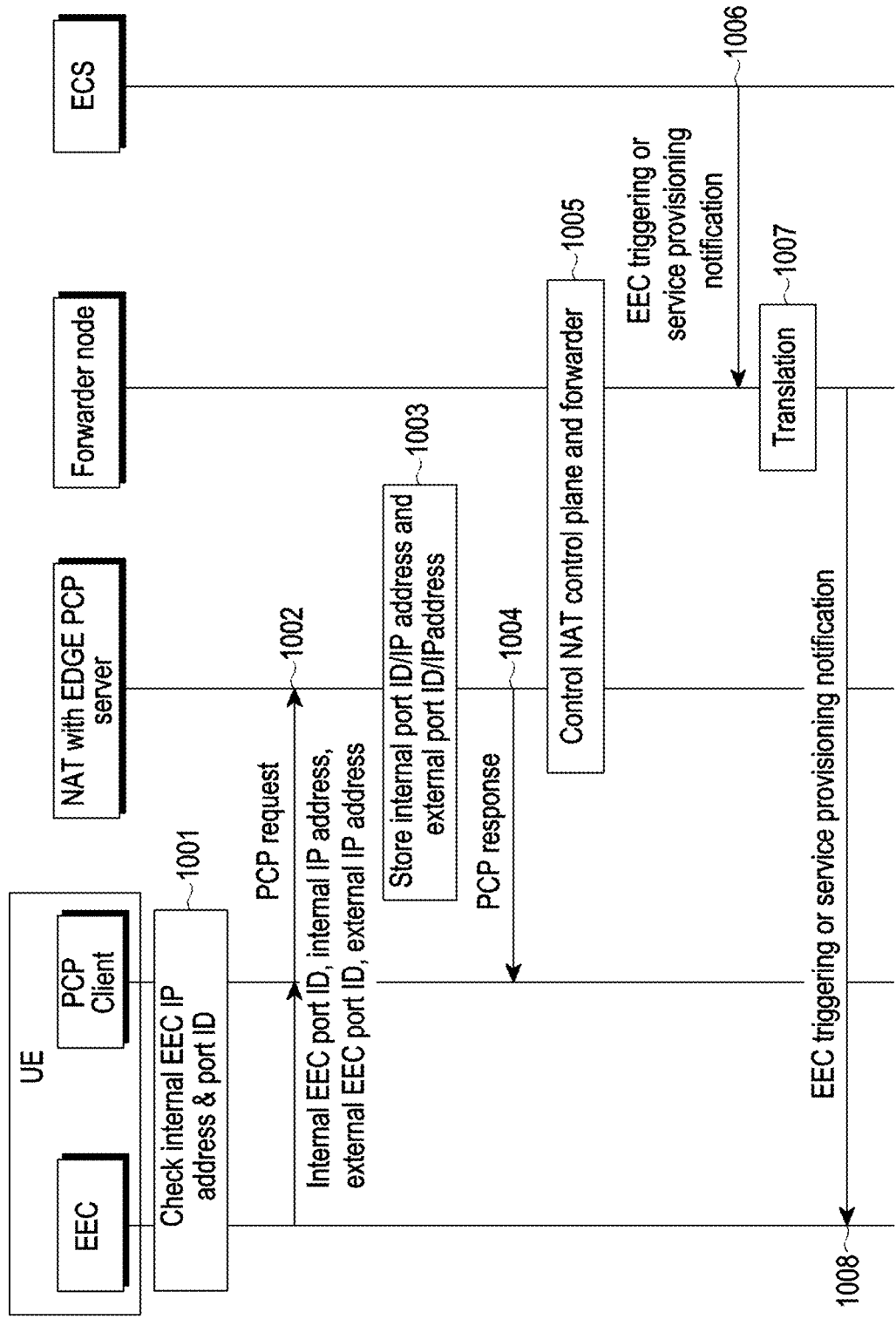
FIG. 10 is a flowchart illustrating an EEC triggering procedure using a port control protocol (PCP) in a wireless communication system supporting edge computing according to an embodiment of the disclosure.

FIG. 10 is a flowchart illustrating an EEC triggering procedure using a port control protocol (PCP) in a wireless communication system supporting edge computing according to an embodiment of the disclosure. In the embodiment of FIG. 10, a UE includes an EEC described above in connection with 1 and a PCP client for PCP. The PCP is a protocol for controlling a method for converting and transferring packets received from a router performing network address translation (NAT) or packet filtering in IPv4 or IPv6, and the NAT is an address conversion scheme for allocating and mapping multiple private IP addresses to one public IP address. The NAT and PCP may be implemented in the UPF or in the node between the UPF and the data network.

Referring to FIG. 10, in operation 1001, the EEC and PCP client in the UE identify the IP address and port ID (port number) allocated to the EEC. In operation 1002, the EEC transmits, to a PCP server, a PCP request including the internal port ID and internal IP address currently allocated to the EEC through the PCP client. The PCP request may include a desired internal EEC port ID if the desired internal EEC port ID is not yet allocated to the EEC. The PCP request may further include an external EEC IP address and an external EEC port ID desired to be allocated to the EEC. If the internal EEC port ID and the internal EEC IP address are changed, the EEC and the PCP client may perform a PCP request procedure, notifying the PCP server of it. The internal IP address may be appreciated as a private IP address allocated to a device (e.g., EEC) in the local network, and the external IP address may be appreciated as a unique IP address allocated to identify the device from the outside, e.g., Internet. At least one internal IP address may be mapped to one external IP address.

In operation 1003, the PCP server (NAT with EDGE PCP server) determines and stores the internal/external EEC port ID and IP address mapping table for the EEC based on the information received from the PCP client. In operation 1004, the PCP server transmits a PCP response including information about the internal/external EEC port ID and internal/external IP address determined for the EEC to the PCP client. The PCP client may transfer the information received through the PCP response to the EEC. In operation 1005, the PCP server may configure a forwarding rule and control plane of the NAT-applied node (e.g., forwarder node) in the ECS and the EEC. Thus, information transmitted by the ECS may be forwarded to the EEC. The PCP server may be together implemented in the NAT-applied node according to the deployment scenario of the PCP server.

Thereafter, if the EDN configuration information (e.g., at least one of EDN data network name (DNN), network slice information (e.g., S-NSSAI information), EDN service area information, EES address information or EAS information registered in EES) is changed (e.g., generated, added, or deleted), the ECS transfers, to the forwarder node, a service provisioning notification including the above-described information for EEC triggering or changed EDN configuration information and EES profile information to allow it to be provided to the EEC, so as to provide the changed configuration information to the UE. The forwarder node receiving the information for EEC triggering or service provisioning notification from the ECS may identify the internal IP address and the internal port ID of the EFC based on the forwarding rule in operation 1007. In operation 1008, the forwarder node transmits, to the EEC, the service provisioning notification or the information for EEC triggering based on the internal IP address and the internal port ID of the identified EEC address. In the embodiment of FIG. 10, the NAT and forwarder node are network entities connected between the UPF and the (E)DN, i.e., on the N6 interface path.

In the above-described embodiments, the procedures performed through EEC triggering in the UE are not limited to service provisioning targeting the ECS. For example, when there is information that the EES desires to transfer to the EEC, the EES may perform EEC triggering. In this case, the UE may be notified of a change in the information about the EAS registered with the EES and, due to EFC triggering, EAS discovery, EEC registration, and EAS dynamic information subscribe may be performed. Further, the EEC receiving the information for EEC triggering may determine what procedures are to be performed, as follows. For example, the EEC may perform different operations based on the entity (e.g., ECS or EES) which has performed EEC triggering and/or the information included in the information for EEC triggering.

As in the above-described embodiments, for EEC triggering, various methods may be used in which the ECS, EES, and EAS transfer necessary information to the UE through NAS signaling and perform EEC triggering using the 3GPP network function. For example, when the UE is an IoT terminal, EEC triggering may be performed using non-IP data delivery. When the UE supports non-IP data delivery, the ECS or EES may transfer, to the NEF, information for EEC triggering including the "indication to trigger EEC" information using the Nnef_NIDD_Delivery service (message) among the services of the NEF in TS 23.502 and transfer the information for EEC triggering to the UE via the SMF and the AMF.

Figure 11:
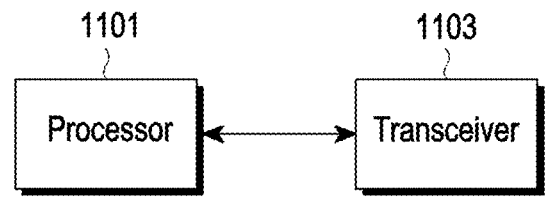
FIG. 11 is a view illustrating a configuration of a UE according to an embodiment of the disclosure.

FIG. 11 is a view illustrating a configuration of a UE according to an embodiment of the disclosure.

Referring to FIG. 11, a UE may be implemented to include a processor 1101 and a transceiver 1103 capable of wireless communication according to a communication scheme determined in the above-described wireless communication system supporting edge computing and a memory (not shown). The processor 1101, the transceiver 1103, and the memory may be implemented in the form of at least one chip. The processor 1101 may control the operation of the transceiver 1103 and control the overall device to be able to receive changed configuration information related to the edge computing service by receiving information for EEC triggering by each, or a combination of two or more, of the embodiments of FIGS. 1 to 10 using a program (application client, EEC, push function, or PCP client) installed/stored in the memory of the UE.

Figure 12:
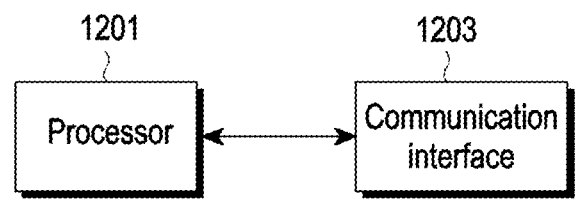
FIG. 12 is a view illustrating a configuration of a network entity according to an embodiment of the disclosure.

FIG. 12 is a view illustrating a configuration of a network entity according to an embodiment of the disclosure. The network entity may be, e.g., at least one of EAS, EES, ECS, and each component of the core network described with reference to FIGS. 1 to 10. Further, the network entity may be implemented, e.g., in the form of a server.

Referring to FIG. 12, the network entity may be implemented to include a processor 1201 and a communication interface 1203 capable of wired/wireless communication according to a communication scheme determined in the above-described wireless communication system supporting edge computing and a memory (not shown). The processor 1201 may control the operation of the communication interface 1203 and control the overall device for the UE to be able receive changed configuration information related to the edge computing service by providing the UE with information for EEC triggering by each, or a combination of two or more, of the embodiments of FIGS. 1 to 10 using a program (the corresponding function of the EAS, EES, ECS, or each component of the core network described in connection with FIGS. 1 to 10) installed/stored in the memory in the network entity.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) including an edge enabler client (EEC) in a communication system supporting an edge computing service using an edge data network (EDN) exchanging application data traffic with the UE, the method comprising:
   identifying whether the UE supports a short message service (SMS) over non-access-stratum (NAS);
   transmitting, to an edge configuration server (ECS) managing configuration information of the EDN, a first service provisioning request message including an indication of the SMS over the NAS supported in case that the UE supports the SMS over the NAS; and
   in case that the UE receives, through a network from the ECS, an SMS message including triggering information related to an update of the configuration information, transmitting, to the ECS, a second service provisioning request message based on the triggering information.

2. The method of claim 1, wherein the triggering information includes at least one of an indication to trigger a transmission of the second service provisioning request message by the EEC, an EEC identification (ID) of the EFC, a UE ID of the UE, or address information of the ECS.

3. The method of claim 2, wherein the triggering information further includes an EEC port number of the EEC, and
   wherein the EEC port number of the EEC is allocated per EEC ID of the EEC.

4. The method of claim 1, further comprising receiving, from the ECS, a response message including information indicating whether EEC triggering via the SMS over the NAS is available in response to transmitting the first service provisioning message.

5. A user equipment (UE) in a communication system supporting an edge computing service using an edge data network (EDN) exchanging application data traffic with the UE, the UE comprising:
   a transceiver; and
   a processor operably connected to the transceiver, the processor configured to:
   identify whether the UE supports a short message service (SMS) over non-access-stratum (NAS),
   transmit, to an edge configuration server (ECS) managing configuration information of the EDN via the transceiver, a first service provisioning request message including an indication of the SMS over the NAS supported in case that the UE supports the SMS over the NAS, and
   in case that the UE receives, through a network from the ECS, an SMS message including triggering information related to an update of the configuration information, transmit, to the ECS via the transceiver, a second service provisioning request message based on the triggering information.

6. The UE of claim 5, wherein the triggering information includes at least one of an indication to trigger a transmission of the second service provisioning request message by the EEC, an EEC identification (ID) of the EEC, a UE ID of the UE, or address information of the ECS.

7. The UE of claim 6, wherein the triggering information further includes an EEC port number of the EEC, and
wherein the EEC port number of the EEC is allocated per EEC ID of the EEC.

8. The UE of claim 5, wherein the processor is further configured to receive, from the ECS via the transceiver, a response message including information indicating whether EEC triggering via the SMS over the NAS is available in response to transmitting the first service provisioning message.

9. A method of an edge configuration server (ECS) managing configuration information of an edge data network (EDN) in a communication system supporting an edge computing service using the EDN exchanging application data traffic with a user equipment (UE), the method comprising:
receiving, from the UE, a first service provisioning request message including an indication of short message service (SMS) over non-access-stratum (NAS) supported;
identifying whether the configuration information of the EDN is updated;
transmitting, to the UE through a network, triggering information related to an update of the configuration information in case that the configuration information of the EDN is updated; and
receiving, from the UE receiving a SMS message including the triggering information, a second service provisioning request message based on the triggering information.

10. The method of claim 9, wherein the triggering information includes at least one of an indication to trigger a transmission of the second service provisioning request message by the EEC, an EEC identification (ID) of the EEC, a UE ID of the UE, or address information of the ECS.

11. The method of claim 10, wherein the triggering information further includes an EEC port number of the EEC, and
wherein the EEC port number of the EEC is allocated per EEC ID of the EEC.

12. The method of claim 9, further comprising transmitting, to the UE, a response message including information indicating whether EEC triggering via the SMS over the NAS is available in response to receiving the first service provisioning message.

13. An edge configuration server (ECS) managing configuration information of an edge data network (EDN) in a communication system supporting an edge computing service using the EDN exchanging application data traffic with a user equipment (UE), the ECS comprising:
a communication interface; and
a processor operably connected to the communication interface, the processor configured to:
receive, from the UE via the communication interface, a first service provisioning request message including an indication of short message service (SMS) over non-access-stratum (NAS) supported,
identify whether the configuration information of the EDN is updated,
transmit, to the UE through a network, triggering information related to an update of the configuration information in case that the configuration information of the EDN is updated, and
receive, from the UE receiving a SMS message including the triggering information, a second service provisioning request message based on the triggering information.

14. The ECS of claim 13, wherein the triggering information includes at least one of an indication to trigger a transmission of the second service provisioning request message by the EEC, an EEC identification (ID) of the EFC, a UE ID of the UE, or address information of the ECS.

15. The ECS of claim 14, wherein the triggering information further includes an EEC port number of the EEC, and
wherein the EEC port number of the EEC is allocated per EEC ID of the EEC.

16. The ECS of claim 13, wherein the processor is further configured to transmit, to the UE via the communication interface, a response message including information indicating whether EEC triggering via the SMS over the NAS is available in response to receiving the first service provisioning message.

* * * * *